(12) United States Patent
Beardsley et al.

(10) Patent No.: US 6,170,023 B1
(45) Date of Patent: Jan. 2, 2001

(54) SYSTEM FOR ACCESSING AN INPUT/ OUTPUT DEVICE USING MULTIPLE ADDRESSES

(75) Inventors: Brent Cameron Beardsley; James Lincoln Iskiyan, both of Tucson, AZ (US); James McIlvain, Los Gatos, CA (US); Philip Ray Mills; Michael Aloysius Paulsen, both of Morgan Hill, CA (US); William G. Thompson, Indio, CA (US); Harry Morris Yudenfriend, Poughkeepsie, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/168,017

(22) Filed: Oct. 7, 1998

(51) Int. Cl.[7] ..................................................... G06F 13/00
(52) U.S. Cl. ................................... 710/36; 710/3; 710/7; 711/112; 711/200
(58) Field of Search ............................... 710/3–7, 20–21, 710/36–45; 711/112–114, 200

(56) References Cited

U.S. PATENT DOCUMENTS

| 4,149,242 | 4/1979 | Pirz | 364/200 |
| 4,408,273 | 10/1983 | Plow | 364/200 |

(List continued on next page.)

FOREIGN PATENT DOCUMENTS

| 58-056058 | 4/1983 | (JP) . |
| 2082378 | 3/1990 | (JP) . |

OTHER PUBLICATIONS

IBM 3990/9390 Storage Control; Document No. GA32–0274–04; Fifth Edition, Oct. 1996 (selected portions of Chapter 2).

IBM 3990 Storage Control Reference (Models 1, 2, and 3); Document No. GA32–0099–06, Seventh Edition, Oct., 1994 (selected portions of Chapters 1, 2, and 4).

IBM Technical Disclosure Bulletin Deleting Objects on Worm Media, vol. 32, No. 7, Dec. 1989.

IBM Technical Disclosure Bulletin Separate Write/Read Logical Paths to Optimize Library Network File System Data Rates, vol. 37, No. 09, Sep. 1994.

USSN 09/167,782, filed Oct. 7, 1998 (Atty. Dkt. No. TU9–98–019 18.27).

USSN 09/167,860, filed Oct. 7, 1998 (Atty. Dkt. No. TU9–98–025 18.32).

USSN 09/197,605, filed Oct. 7, 1998 (Atty. Dkt. No. TU9–98–037 18.36).

USSN 09/167,603, filed Oct. 7, 1998 (Atty. Dkt. No. TU9–98–061 18.39).

*Primary Examiner*—Christopher B. Shin
(74) *Attorney, Agent, or Firm*—David W. Victor; Konrad Raynes & Victor LLP

(57) ABSTRACT

Disclosed is a system for performing input/output (I/O) operations with a processing unit. A processing unit, such as a host system, determines a base and associated alias addresses to address an I/O device, such as a direct access storage device (DASD). The processing unit associates the determined base and alias addresses to the I/O device. The association of base and alias addresses is maintained constant for subsequent I/O operations until the processing unit detects a reassignment of the association of base and alias addresses. The processing unit then determines an available base or alias address to use with an I/O operation and may concurrently execute multiple I/O operations against the I/O device using the base and alias addresses.

27 Claims, 7 Drawing Sheets

U.S. PATENT DOCUMENTS

| | | | |
|---|---|---|---|
| 4,453,211 | 6/1984 | Askinazi et al. | 364/200 |
| 5,097,410 | 3/1992 | Hester et al. | 395/275 |
| 5,197,069 | 3/1993 | Cook et al. | 371/7 |
| 5,261,072 | 11/1993 | Siegel | 395/425 |
| 5,274,773 | 12/1993 | Squires et al. | 395/275 |
| 5,276,826 | 1/1994 | Rau et al. | 395/400 |
| 5,333,315 | 7/1994 | Saether et al. | 395/600 |
| 5,388,219 * | 2/1995 | Chan et al. | 710/72 |
| 5,392,443 | 2/1995 | Sakakibara et al. | 395/800 |
| 5,404,474 | 4/1995 | Crook et al. | 395/400 |
| 5,418,921 * | 5/1995 | Cortney et al. | 64/222.82 |
| 5,488,707 | 1/1996 | Phillips et al. | 395/420 |
| 5,493,668 * | 2/1996 | Elko et al. | 711/130 |
| 5,493,724 * | 2/1996 | Cohn et al. | 710/38 |
| 5,528,764 | 6/1996 | Heil | 395/293 |
| 5,530,897 | 6/1996 | Meritt | 395/829 |
| 5,553,285 | 9/1996 | Krakauer et al. | 395/600 |
| 5,564,019 * | 10/1996 | Beausoleil et al. | 709/215 |
| 5,568,629 | 10/1996 | Gentry et al. | 395/441 |
| 5,581,768 | 12/1996 | Garney et al. | 395/674 |
| 5,640,591 | 6/1997 | Rosenthal et al. | 395/823 |
| 5,664,152 | 9/1997 | Ezzett | 711/153 |
| 5,680,580 | 10/1997 | Beardsley et al. | 395/489 |
| 5,701,429 * | 12/1997 | Legvold et al. | 711/114 |
| 5,765,200 * | 6/1998 | McIlvain et al. | 711/170 |
| 5,860,138 | 1/1999 | Engebretsen et al. | 711/202 |
| 5,862,363 * | 1/1999 | Taroda et al. | 395/500 |
| 5,893,918 * | 4/1999 | Beardsley et al. | 711/112 |

* cited by examiner

Fig. 5

| Channel Subsystem 20 | | | | | | | | | |
|---|---|---|---|---|---|---|---|---|---|
| Subchannel | 0 | 1 | 2 | 3 | ...7... | ...16... | ...22... | ...99... | |
| Unit Address (UA) | | | | | 14 | 25 | 333 | 12 | |
| Device No. | | | | | FFF0 | FF26 | 0053 | 0414 | |
| SCHIB | | | | | | | | | |

42

SYSTEM FOR ACCESSING AN INPUT/OUTPUT DEVICE USING MULTIPLE ADDRESSES

CROSS-REFERENCE TO RELATED APPLICATIONS

This application is related to the following co-pending and commonly-assigned patent applications, all of which are filed on the same date herewith, and all which are incorporated herein by reference in their entirety:

"Method And System For Dynamically Assigning Addresses To An Input/Output Device," by Brent C. Beardsley, Allan S. Merritt, Michael A. Paulsen, and Harry M. Yudenfriend, U.S. application Ser. No. 09/167,782; and "Input/Output Operation Request Handling in a Multi-Host System," by Brent C. Beardsley, Joseph C. Elliot, and James L. Iskiyan, U.S. application Ser. No. 09/167,860; and "Method and System for Reassigning Addresses To An Input/Output Device," by Brent C. Beardsley, Allan S. Merritt, Michael A. Paulsen, and Harry M. Yudenfriend, U.S. application Ser. No. 09/167,603.

BACKGROUND OF THE INVENTION

1. Field of the Invention

The present invention relates to a method and system for accessing an Input/Output (I/O) device, such as a volume, and, in particular providing for concurrent multiple I/O operations directed toward the same I/O device.

2. Description of the Related Art

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 14 includes CPUs 6a, b that contain the sequencing and processing facilities for instruction execution, interruption action, timing functions, initial program loading, and other machine-related functions. The CPUs 6a, b may be host systems. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit image provides access to one or more I/O devices 10a, b, c. The storage controller 8 may include multiple control unit images, i.e., LSSs, each of which may address up to 256 I/O devices.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 13 provide data communication between the channel subsystem 2 and the storage controller 8. The channel paths 13 may employ a parallel-transmission protocol or a serial-transmission protocol. The storage controller 8 includes control logic to physically access the I/O devices 10a, b, c and control data transfer. In preferred embodiments, multiple channel paths 13 may be dedicated for communication with a particular I/O device 10a, b, c.

A subchannel 14a, b, c is dedicated to each I/O device 10a, b, c accessible to the channel subsystem 2, i.e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 13 may be accessed using any of the available channel paths 13. An I/O device 10a, b, c is addressed by channel-path identifiers (CHPIDs) identifying the path to a device, subchannel numbers identifying the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 13 leading to the host system 4 when logically reconnecting to the channel subsystem 2.

The main storage 12 includes unit control blocks (UCBs) which include information on the subchannels and I/O devices. The CPUs 6a, b may access the UCB information when initiating I/O operations.

The channel subsystem 2 may receive numerous I/O operations from CPUs 6a, b directed toward the I/O devices 10a, b, c. The channel subsystem 2 initiates a channel program which comprises a series of channel commands to access and perform the I/O operation requested by the host system 4. An I/O operation toward a volume operates through the execution of a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory 12, and chain command information specifying whether commands are chained together. With each chain of commands, a define extent command may be provided indicating the permissible I/O operations that may be performed and a locate record command indicating the actual I/O operation to be performed. The chain of CCW commands may operate within the defined extent range. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

A subchannel 14a, b, c establishes an active allegiance for a channel path when active communication is initiated with the I/O device 10a, b, c on the channel path. In current systems, the subchannel 14a, b, c can have an active allegiance to only one channel path at a time. While a subchannel 14a, b, c has an active allegiance on a channel path 13 to an I/O device 10a, b, c, the channel subsystem 2 does not actively communicate with that device on any other channel path. Thus, there is only one path of communication, and hence one channel program, directed toward an I/O device 10a, b, c at a given time even though there may be multiple dynamic channel paths 13 leading to the I/O device 10a, b, c. Although dynamic channel pathing provides multiple paths from the channel subsystem 2 to the storage controller 8, only one of the dynamic paths is used at a time to communicate with the I/O device 10a, b, c. The dynamic paths are used to provide an alternative path for reconnecting the storage controller 8 and the I/O device 10a, b, c to the host system 4. In preferred embodiments, the storage controller 8 selects the path for reconnection. In the prior art, execution of a channel program for a single host system along multiple paths would likely create device-busy conditions detectable by the channel subsystem and cause unpredictable results.

Thus, with prior art servers employing the channel subsystem architecture of the IBM ESA/390 server and other similar server systems known in the art, a single host system cannot direct concurrent, multiple I/O operations toward the same volume, i.e., I/O device. In the current art, to execute multiple channel programs toward the same I/O device 10a, b, c, the channel program operations must be queued and executed serially; multiple channel programs cannot be executed at once toward the same I/O device 10a, b, c. Otherwise, if the multiple I/O tasks return data from the same device to a single host, then the host could not relate the data to the completed I/O task because the host cannot distinguish on the basis of the single base address for the target I/O device 10a, b, c. Prior art systems are described in the IBM publications "ESA/390 Principles of Operation," IBM document no. SA22-7201-04 (IBM Copyright 1990, 1991, 1993, 1994, 1996, 1997), and U.S. Pat. No. 5,197,069, entitled "Method and System for Detecting and Recovering from Switching Errors," assigned to IBM, which publications and patent are incorporated herein by reference in their entirety.

SUMMARY OF THE PREFERRED EMBODIMENTS

To overcome the limitations in the prior art described above, the present invention discloses a system for processing an input/output (I/O) operation. A first processing unit maintains information indicating an association of at least one alias address to a base address. The base and associated alias addresses are used to address an I/O device. A second processing unit queries the first processing unit for information on base and associated alias addresses for at least one I/O device. The second processing unit further processes the queried information to determine the base and associated alias addresses that address the I/O device and determines whether the base address for an I/O device is available. The second processing unit initiates a first I/O operation against the I/O device using the base address after determining that the base address is available. The second processing unit initiates a second I/O operation against the I/O device using one of the alias addresses to access the I/O device when the base address is unavailable. The second processing unit is capable of executing the first and second I/O operations concurrently against the I/O device.

In further embodiments, a processing unit determines a base and associated alias addresses to address an I/O device. The processing unit associates the determined base and alias addresses to the I/O device. The association of base and alias addresses is maintained constant for subsequent I/O operations until the processing unit detects a reassignment of the association of base and alias addresses. The processing unit then determines an available base or alias address to use with an I/O operation and may concurrently execute multiple I/O operations against the I/O device using the base and alias addresses.

Preferred embodiments thus provide a method and system to allow a host system to initiate I/O operations toward the same I/O device or volume when multiple data paths are provided to the volume. Multiple, concurrent I/O operations may be directed toward the volume by using the base and alias addresses that address the volume. A base address and its alias addresses reference the same I/O device and data paths leading thereto.

BRIEF DESCRIPTION OF THE FIGURES

Referring now to the drawings in which like reference numbers represent corresponding parts throughout:

FIG. 5 illustrates information maintained within the host system in accordance with preferred embodiments of the present invention;

DETAILED DESCRIPTION OF THE PREFERRED EMBODIMENTS

In the following description, reference is made to the accompanying drawings which form a part hereof. The drawings provide illustration of several embodiments of the present invention. It is understood that other embodiments may be utilized and structural and operational changes may be made without departing from the scope of the present invention.

Hardware and Software Environment

Figure 1:
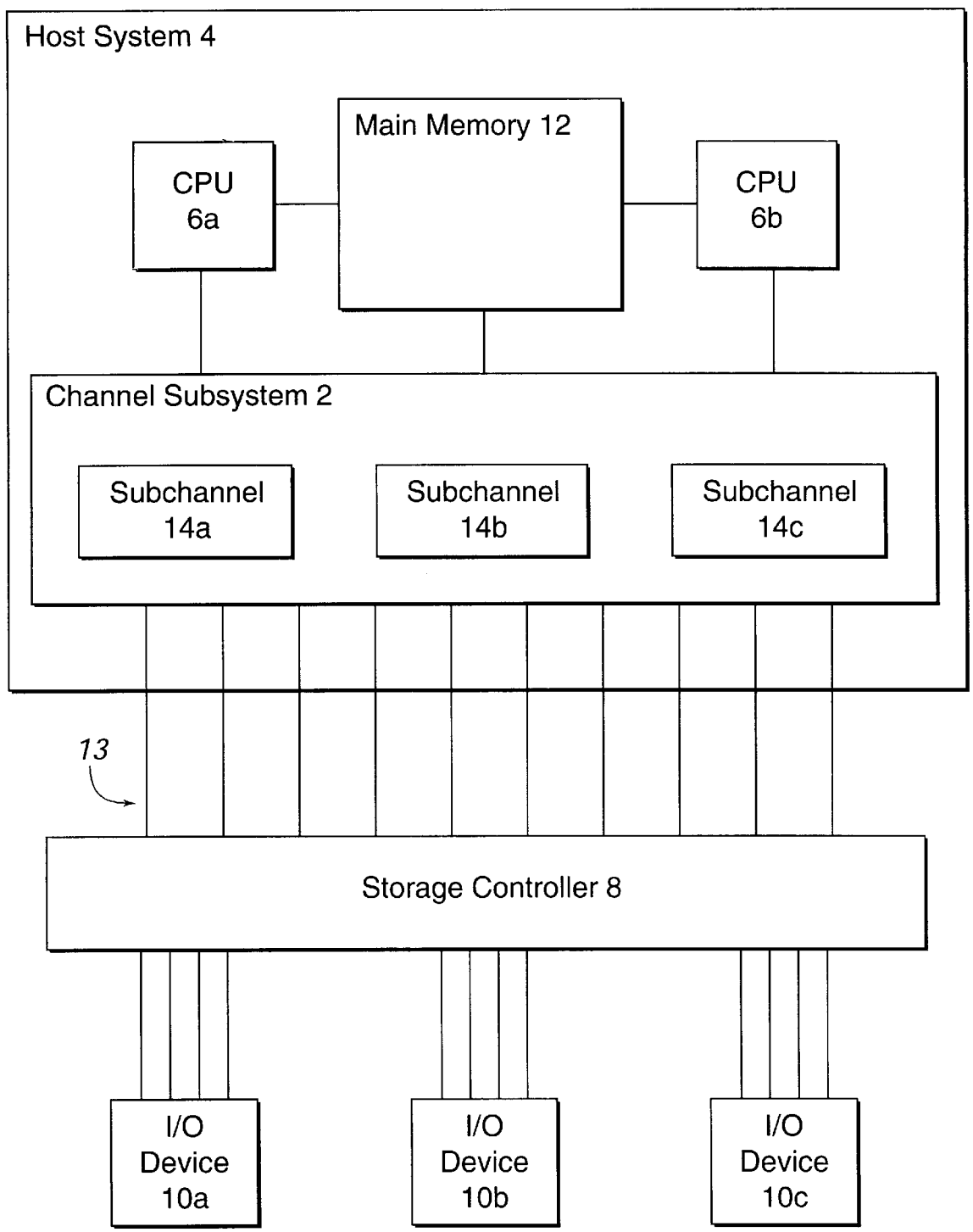
FIG. 1 illustrates a prior art system for handling I/O operations.
Figure 2:
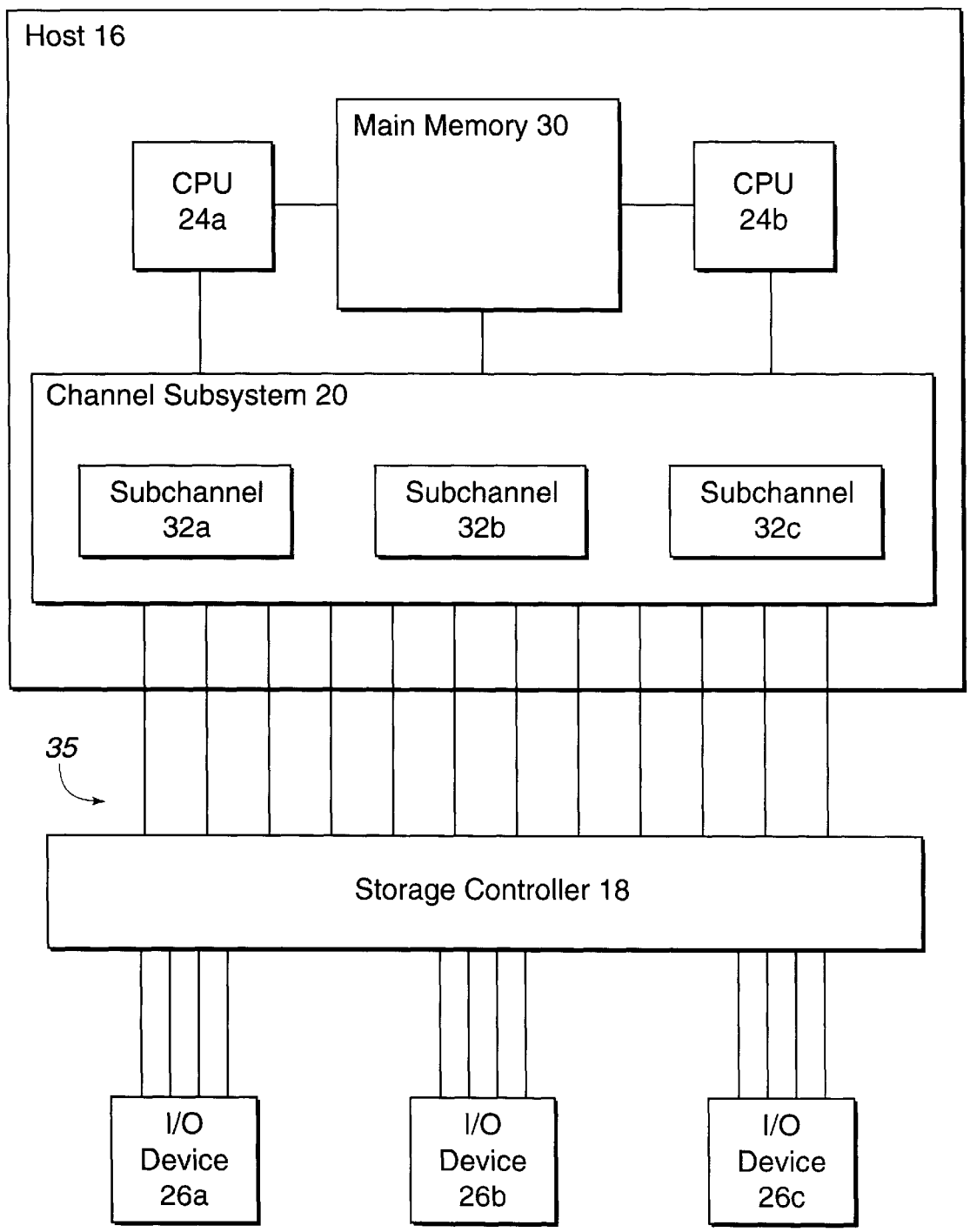
FIG. 2 illustrates a preferred hardware and software structure in which preferred embodiments of the present invention are implemented.

FIG. 2 illustrates a preferred hardware and software environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. As discussed, the storage controller 18 may include multiple logical subsystems (LSSs), i.e., control unit images, wherein each LSS may address up to 256 devices. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18.

The host 16 maintains unit control blocks (UCB) that include device (volume) identification information and a device number. A device number relates a unit control block (UCB) to a single subchannel 32a, b, c. The host 16 processes the UCB to determine the subchannel 32a, b, c for the I/O device 26a, b, c associated with the UCB. During initialization, each I/O device 26a, b, c is associated with a subchannel 32a, b, c. The host 16 processes the information in the subchannel 32a, b, c to address an I/O operation to an I/O device 26a, b, c. In particular, the host 16 initiates an I/O operation toward an I/O device 26a, b, c by initiating a channel program which consists of a series of I/O instructions, such as a chain of CCW commands, on the subchannel 32a, b, c.

Each subchannel 32a, b, c further maintains a unit address corresponding to the device number which identifies the I/O device 26a, b, c to the storage controller 18. Thus, the subchannels 32a, b, c maintain device number and unit address information for the I/O device 26a, b, c associated with the subchannel 32a, b, c. For each base and alias address, a unit address, device number, subchannel, and UCB comprise a means for the host 16 to communicate with the I/O device 26a, b, c (volume). The UCB may also maintain status information on the associated I/O device 26a, b, c. The subchannel 32a, b, c is used to transmit the I/O operation to the storage controller 18 using the unit address associated with the selected subchannel 32a, b, c.

The storage controller 18 maintains a different view of the system. The storage controller 18 is provided a base unit address for each I/O device 26a, b, c (volume) and one or more alias unit addresses for each base unit address. As discussed, for each logical subsystem (LSS) within the storage controller 18, the 256 addresses for a LSS may be allocated in any manner between base and alias addresses. After assigning a base address to each I/O device, the remaining addresses can be allocated as alias addresses to the base addresses in any arrangement. The storage controller 1 8 uses the unit addresses to physically access the I/O devices 26a, b, c (volumes). In preferred embodiments, the structure of the storage controller 18 and interface between the storage controller 18 and host system 16 may be the storage controller 18 structure described in the following U.S. patent applications assigned to IBM: "Failover System for a Multiprocessor Storage Controller," to Brent C. Beardsley, Matt Kalos, Ronald R. Knowlden, Ser. No. 09/026,622, filed on Feb. 20, 1998; and "Failover and Failback System for a Direct Access Storage Device," to Brent C. Beardsley and Michael T. Benhase, Ser. No. 08/988,887, filed on Dec. 11, 1997, both of which applications are incorporated herein by reference in their entirety.

Base And Alias Addresses

Figure 3:
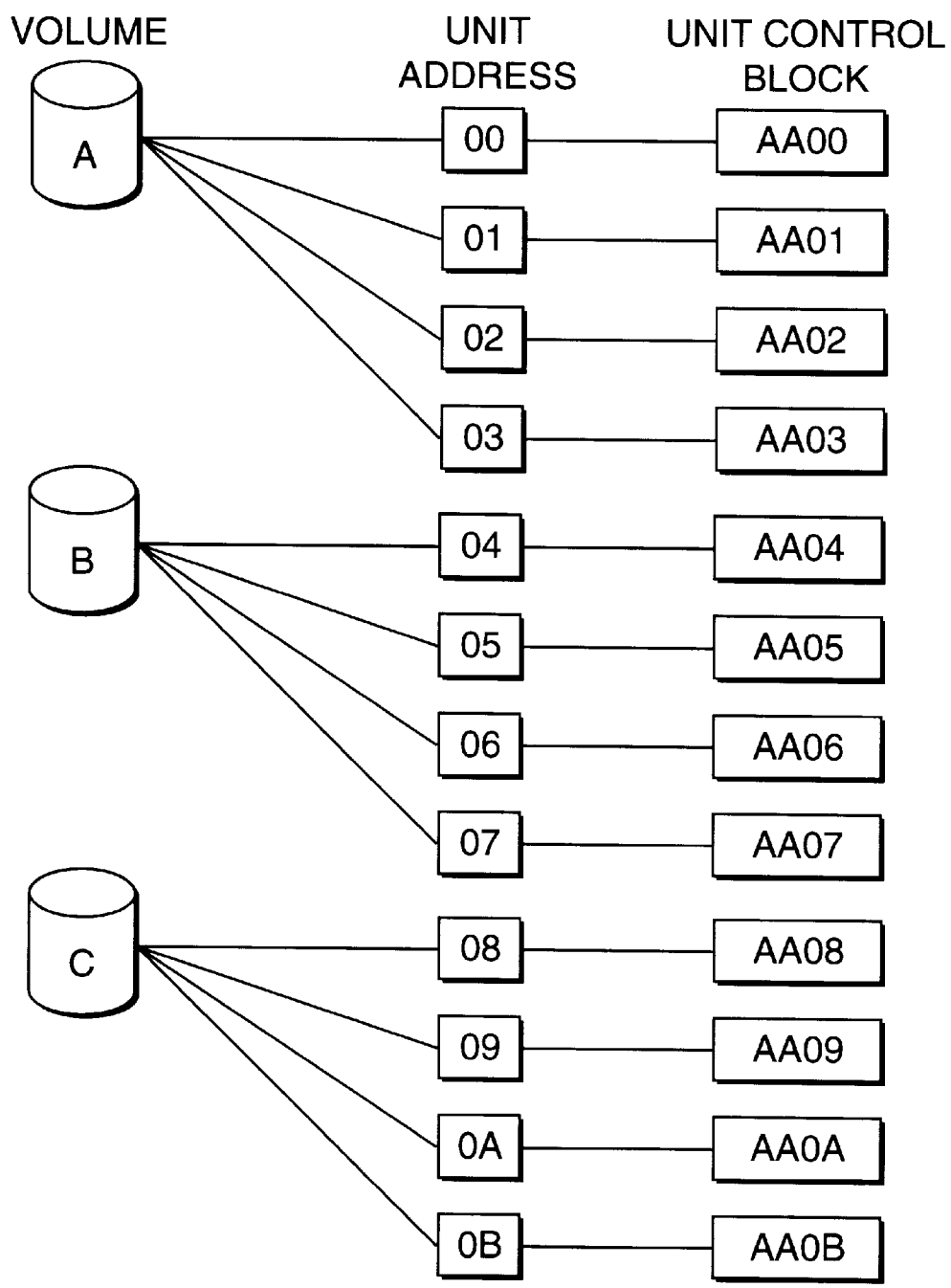
FIG. 3 illustrates how multiple addresses can relate to a single volume in accordance with preferred embodiments of the present invention.

FIG. 3 illustrates how a base and multiple alias addresses address an I/O device 26a, b, c in accordance with preferred embodiments of the present invention. In FIG. 3, the I/O device 26a, b is a volume in a storage device, such as a direct access storage device (DASD). For each base and alias address, there is a corresponding UCB and unit address. One of the unit addresses and UCBs is for the base address and the other three are the alias addresses. Each unit address and UCB corresponds to a single subchannel 32a, b, c which further relates to a plurality of channel paths 35 that link the channel subsystem 20 to the storage controller 18. A volume may be addressed with either the base or alias addresses associated with the volume. For instance, with reference to FIG. 3, volume A may be addressed using base unit address 00 and base UCB AA00, and alias unit addresses 01, 02, 03 and alias UCBs AA01, AA02, AA03. The main memory 30 includes a UCB for each alias address and base address assigned to a volume. The host 16, i.e., CPUs 24a, b, accesses the UCBs to determine the status of the I/O devices 26a, b, c. The UCBs in turn provide the subchannel 32a, b, c information, which further provides the unit address information needed for the I/O operation.

In preferred embodiments, every channel path 35 from the channel subsystem 20 provides a unique path to a volume (I/O device). An I/O operation or chain of CCW commands can be simultaneously executed toward the same volume using the different base and alias unit addresses for the volume. In this way, the executed CCW commands are all directed toward the same I/O device 26a, b, c using different addresses, wherein each address uses one of multiple channel paths 35 to reach a single volume or I/O device 26a, b, c. This allows a single host 16 to concurrently execute multiple I/O operations against a single volume. As discussed, alias addresses can be selectively allocated to base addresses that address particular I/O devices 26a, b, c as desired. The number of aliases provided for a base should be set according to the size of the volume and the number of concurrent users. In certain cases, only a few aliases may be needed to accommodate network traffic for a particular base address for an I/O device 26a, b, c.

The host 16 first attempts to access a volume (I/O device 26a, b, c) through the base UCB for the I/O device 26a, b, c. If the base UCB is unavailable, i.e., concurrently servicing another I/O operation, then the host 16 may use one of the available alias UCBs to concurrently access the I/O device 26a, b, c. The host system 16 then performs the I/O operations through the subchannel 32a, b, c associated with the UCB and the channel paths 35 provided for the subchannel 32a, b, c. When data is returned to the host system 16, the host system 16 can determine the I/O device 26a, b, c from which the return data came from the address. Thus, if multiple I/O operations are directed toward a single I/O device 26a, b, c concurrently along different subchannels using different UCBs, the host system 24a, b can handle multiple returns from the I/O operations because there are multiple UCBs associated with an I/O device 26a, b, c and, hence, multiple ways to associate the host 16 with an I/O device 26a, b, c. The host 16 may use multiple addresses to access the same volume as long as each channel program executed against one of the base or alias addresses does not try to update data used by another channel program accessing the same device.

Figure 4:
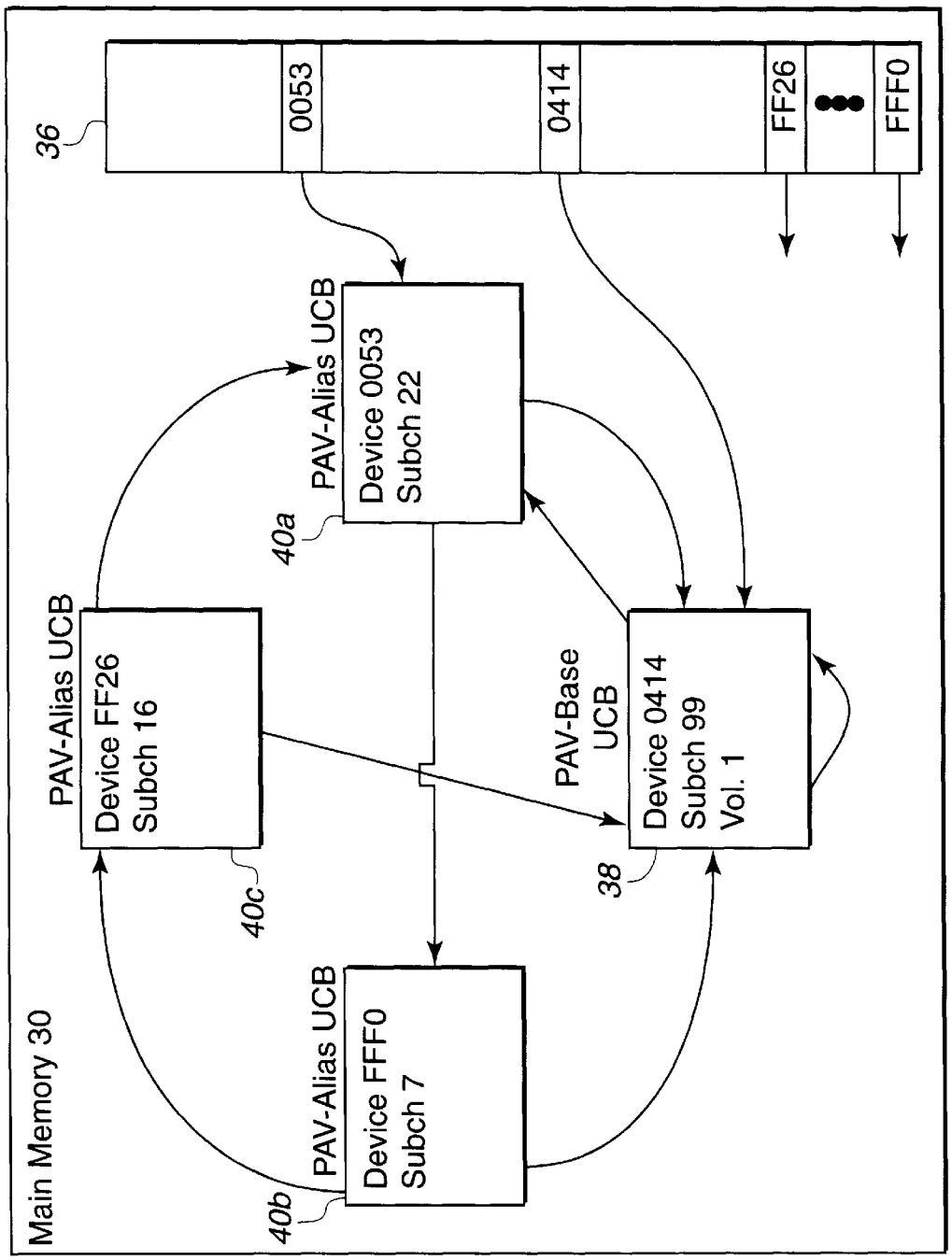
FIG. 4 illustrates data structures indicating base and alias addresses in accordance with preferred embodiments of the present invention.

FIG. 4 illustrates the relationship of a universal look-up table (ULUT) 36 containing the device numbers which relate to base and alias UCBs. In preferred embodiments, the ULUT 36 and UCB data structures 38, 40a, b, c are maintained in the main memory 30 of the host 16. The base 38 and alias UCBs 40a, b, c bound to the base 38 include pointers to address each other. A bound alias UCB indicates that during configuration, the host 16 formally associated, i.e., bound, the alias UCB to a base UCB. If an alias UCB has not been associated with a particular base UCB, then that alias is unbound. Only bound alias UCBs can be used to address a particular I/O device 26a, b, c in lieu of the base UCB 38. In preferred embodiments, the ULUT 36 may also include fields indicating whether a particular UCB identified by the device number in the ULUT is bound or unbound and a base or alias.

The alias UCBs 40a, b, c form a circular chain, referred to herein as the parallel access volume (PAV) circular queue. For instance, device number 0414 references a base UCB 38 and device numbers 0053, FFF0, FF26, each reference an alias UCB 40a, b, c, respectively. The base UCB 38 addresses the first alias UCB bound to that base. Each of the alias UCBs 40a, b, c include a pointer addressing the next alias UCB in the chain and a pointer back to the base UCB 38 to which the alias UCB 40a, b, c is bound. The last bound alias 40c further includes a pointer addressing the first bound alias UCB 40a. The first bound alias UCB 40a includes a pointer to the next bound alias UCB 40b. In this way, the alias and base UCBs 38, 40a, b, c form a chain, i.e., circular queue, of linked UCBs. As shown in FIG. 4, each UCB 38, 40a, b, c includes the subchannel number of the corresponding subchannel that provides address information for the I/O device 26a, b, c (volume) associated with the UCB. In FIG. 4, the base UCB identifies the actual volume, Vol. 1, to which the base refers. U.S. Pat. No. 5,530,897, entitled "System for Dynamic Association of a Variable Number of Device Addresses With Input/Output Devices to Allow Increased Concurrent Requests for Access to the Input/Output Devices," assigned to IBM and which patent is incorporated herein by reference in its entirety, includes further description of the information maintained in the UCBs.

The base UCB 38 of a bound alias UCB, e.g., alias UCB 40b, can be identified from the ULUT 36 and the PAV circular queue. First, the ULUT 36 is used to locate the alias UCB 40b. Then the base UCB 38 may be identified from the pointer in the alias UCB 40b that addresses the base UCB 38. To obtain an address for an I/O operation, the host 16 would first attempt to use the base UCB 38 for the target volume. If the base UCB 38 is involved in an I/O operation or otherwise unavailable, then the pointer in the base UCB 38 to the first alias UCB 40a would be used to determine whether the first alias UCB 40a was available. If so, the first alias UCB 40a would be used to provide an address and subchannel for the I/O operation. Otherwise, the first available alias UCB in the PAV circular queue would be used to provide an address for addressing the volume.

FIG. 5 illustrates a table 42 maintained in the channel subsystem 20 including information for each subchannel. Each subchannel 32a, b, c is identified by a unique 16 bit number starting from 0. Each subchannel 32a, b, c includes the device number assigned to the UCBs maintained in the ULUT 36 that correspond to the subchannel and a unit address identifying the I/O device 26a, b, c (volume) to the subchannel. As discussed, a subchannel 32a, b, c provides the logical appearance of a device to the host 16 and contains the information required for sustaining I/O operations against an I/O device 26a, b, c. Each subchannel 32a, b, c includes a subchannel information block (SCHIB) that includes the channel path identifiers (CHPIDS) of the channel paths 35 associated with the subchannel 32a, b, c. The CHPID is a system-unique eight-bit value assigned to each installed channel path 35 of the system through which the I/O devices 26a, b, c may be reached. Each CHPID 35 identifies a physical channel path. A subchannel 32a, b, c provides multiple channel paths, each identified by a CHPID, which the subchannel 32a, b, c may use to communicate with the I/O devices 26a, b, c. In this way, each subchannel 32a, b, is associated with one UCB through the device number and the unit address. Each subchannel 32a, b, c provides a mechanism to the host 16 for accessing and addressing the I/O device 26a, b, c over the channel paths 35 associated with the subchannel. In this way, multiple subchannels may be used to access the same volume by accessing multiple subchannels leading to the same volume.

For instance, upon selecting a base 38 or alias 40a, b, c address to use for an I/O operation, the host 16 would determine the corresponding channel subsystem 32a, b, c from the UCB of the selected base or alias address. Using the table in the channel subsystem 20 illustrated in FIG. 5, the host system 16 could then determine the unit address. For instance, if the host system 16 selected alias UCB 40b, the host 16 would process the alias UCB 40b to determine the subchannel 7 for the address. From the table in FIG. 5, the host 16 would determine the unit address 14 for subchannel 7.

When the host 16 executes an I/O operation on a subchannel 32a, b, c, the subchannel 32a, b, c provides the unit address of the target I/O device 26a, b, c. The channel subsystem 20, using the subchannel 32a, b, c information then transmits the I/O operation to the unit address associated with the subchannel 32a, b, c. The storage controller 18 then uses this unit address to execute the I/O operation.

Figure 6:
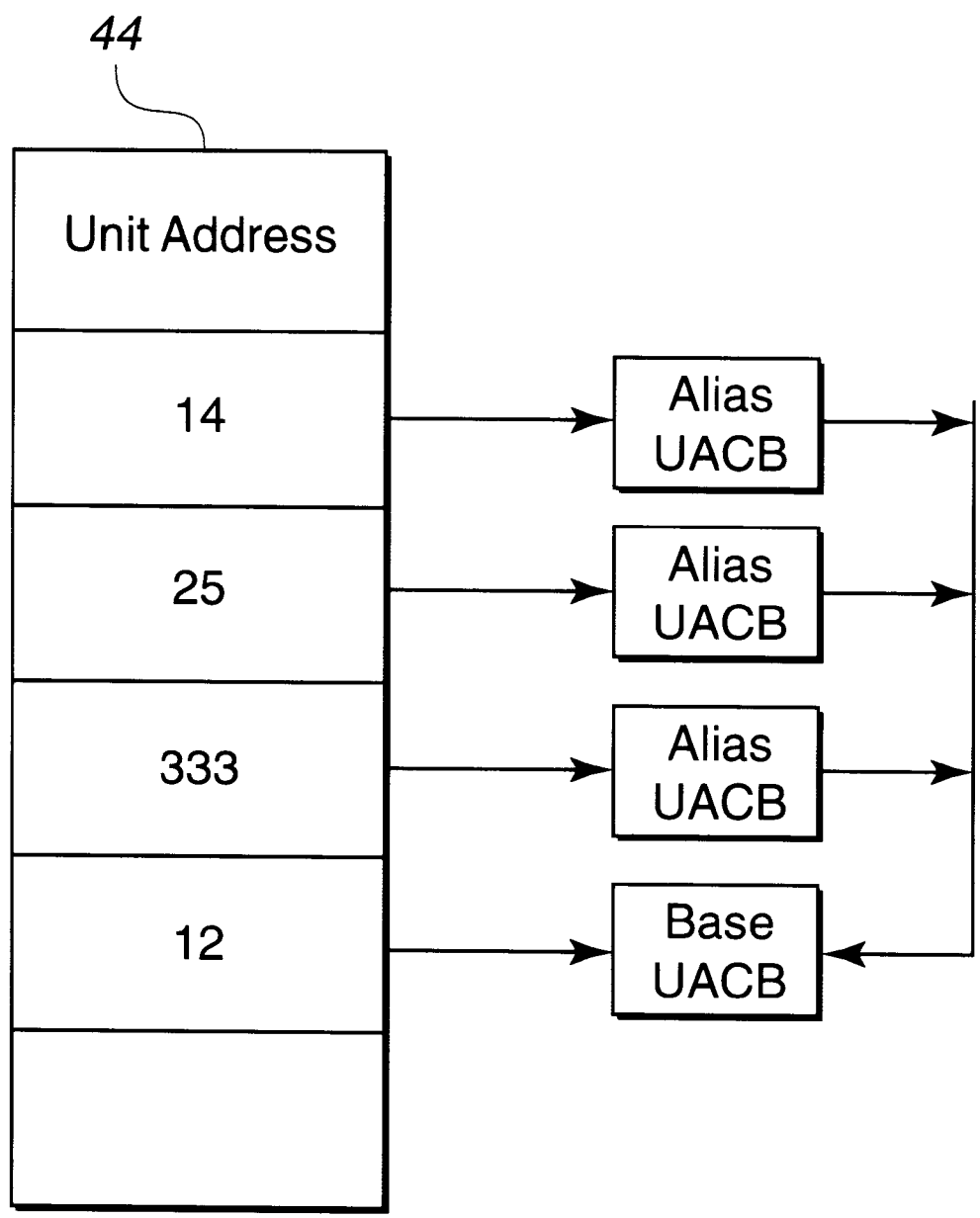
FIG. 6 illustrates information maintained by the storage controller associating base with alias addresses in accordance with preferred embodiments of the present invention.

The storage controller 18 maintains a control block for each unit address, otherwise referred to as a unit address control block (UACB). This UACB includes status information on the I/O device 26a, b, c the unit address addresses. FIG. 6 illustrates a table 44 of unit addresses 14, 25, 333, 12 which point to the corresponding UACB for the unit address. The UACB identifies itself as a base or alias. The alias UACBs include a pointer to the base UACB for that alias. The storage controller 18 can determine the base unit address from the alias unit address by looking up the alias unit address in the table 44, locating the alias UACB from the pointer, and then determining the base UACB from the pointer in the alias UACB. The storage controller 18 would process the base UACB to determine the base unit address for the alias unit address that is the target of the I/O operation.

The storage controller 8 executes a task or I/O operation comprised of a chain of CCW commands by allocating a task control block including control information for an I/O operation, e.g., chain of CCW commands, and queuing the task control block against a base UACB. In this way, a multitude of tasks represented by task control blocks can be queued against a single volume (I/O device 26a, b, c). The task control block includes information needed to execute the chain of commands, such as the unit address, base or alias, that is the target of the task, and any other control information needed to complete the task and return the data to the host system 4.

If the I/O operation is directed toward an alias unit address, the storage controller 18 processes the alias UACB to determine the base unit address from the pointer in the alias UACB to the base UACB. The storage controller 18 then queues the I/O operation, i.e., task control block, against the located base unit address identified in the base UACB. The storage controller 18 queues multiple I/Os against the same base address. If there are multiple paths to the I/O device 26a, b, c (volume) identified by the base unit address, then the storage controller 18 may execute multiple I/O operations in parallel on the multiple paths. Although the storage controller 18 executes the I/O operation against the base unit address, when an I/O operation requires an attention or return message, the storage controller 18 uses the initial alias unit address associated with the I/O operation when returning a message or data to the host system 16.

The host 16 may issue a reserve command to reserve an I/O device 26a, b to prevent other hosts from accessing the I/O device 26a, b, c (volume). The reserve command provides a host exclusive access to a volume. For instance, to allocate a data set, the host system 16 could issue a command to reserve the volume including the data set, read a volume table of contents (VTOC) to determine if the volume the host wants to reserve is available, update the VTOC, and release the volume. Once reserved, no other host can access the volume until the reserving host releases the volume by writing a release to the VTOC. Once reserved, only the reserving host can issue I/O against. When a volume is reserved, the storage controller 18 would reserve all base and alias unit addresses addressing the reserved I/O device 26a, b, c. In preferred embodiments, a host may only issue a reserve command against the base address. No other host can access the volume or I/O device 26a, b, c until the reserving host writes to the VTOC to indicate that the volume is available.

In preferred embodiments, the host 16 and storage controller 18 maintain separate views of the system. For instance, the storage controller 18 has no knowledge of the channel subsystem 20, subchannels 32a, b, UCBs, etc., which are part of the host 16 view.

Configuration Data Records

The host 16 obtains information on the arrangement of the PAV devices by issuing a Read Configuration Data (RCD) command to an I/O device 26a, b, c. In response, the storage controller 18 provides Configuration Data Records (CDR) indicating the addressing, status, and control information for the device. In preferred embodiments, there is one CDR per channel path to an I/O device 26a, b. A CDR includes a variable number of 32 byte fields called node-element descriptors (NED). A node element is any identifiable entity in the system, e.g., volume, RAID Rank, cluster, subsystem, etc. The NED contains data that uniquely describes the node element. The CDR further includes a token NED which identifies the CDRs associated with a logical subsystem (LSS). All the CDRs for a particular LSS, i.e., control unit image, have the same token NED. A storage cluster is a power and service region that runs channel commands and controls the storage devices. Each storage cluster contains both channel and device interfaces. Storage clusters also perform the DASD controller functions.

The main memory 30 includes a configuration data table (CDT) which is comprised of the CDRs for each subchannel 32a, b, c. The host 16 may access this table to access CDR records. Table 1 below shows a preferred embodiment of the fields included in the CDR data structure for an alias UCB in accordance with preferred embodiments of the present invention. The Node Element Qualifier (NEQ) describes the paths and addressees for a particular device, controller, volume, etc. A further description of the NED and NEQ fields are described in IBM document "Storage Subsystem Library: IBM 3990 Storage Control Reference (Models 1, 2, 3)", IBM document no. GA32-0099-06, (IBM Copyright 1988, 1994) and U.S. Pat. No 5,191,069, assigned to IBM, which publication and patent are incorporated herein by reference in their entirety.

TABLE 1

| FIELD | DESCRIPTION |
|---|---|
| 1 | Node Element Descriptor (NED)of the Volume |
| 2 | Node Element Qualifier (NEQ) for the Volume NED. |
| 3 | NED 2, which describes the RAID rank information for the volume. |
| 4 | NED 3 contains the NED for the cluster that the system adaptor resides in. |
| 5 | NED 4 describes the physical subsystem |
| 6 | NEQ, that describes the paths and addresses |

Table 2 below describes fields included in the NEQ field in the CDR when the system supports PAV base and alias addresses in accordance with preferred embodiments of the present invention.

TABLE 2

| FIELD | DESCRIPTION |
|---|---|
| 1 | Flags |
| 2 | Unit Address Flags for the DASD, indicating whether unit address is base address or alias address |
| 3 | Alias Address Parameters. When the unit address is an Alias address, as indicated in Field 2, this field contains the base unit address to which the alias address is bound. |

The NEQ indicates the unit address associated with the device number and subchannel and whether the unit address associated with the CDR is a base or alias. When the unit address is an alias, the third field of the NEQ indicates the base unit address of the I/O device 26a, b, c associated with the alias. The CDT further maintains a subsystem control block (SSCB) which identifies the channel subsystem 20. All CDRs are grouped according to the SSCB. Each UCB addresses the SSCB containing the paths to the I/O device 26a, b, c represented by the UCB.

Table 3 below illustrates the CDR record generated for base addresses and single access volumes (SAVs) which do not have alias addressing capabilities.

TABLE 3

| FIELD | DESCRIPTION |
|---|---|
| 1 | Node Element Descriptor (NED)of the Volume |
| 2 | NED 2, which describes the RAID rank information for the volume. |
| 3 | NED 3 contains the NED for the cluster that the system adaptor resides in. |
| 4 | NED 4 contains the token NED for the subsystem. |
| 6 | NEQ, that describes the paths and addresses |

During initialization, the host 16 issues the RCD commands to obtain the CDR data from the storage controller 18 for each subchannel 32a, b, c. The host 16 furthers issues a set system characteristics command to the storage controller 18 to inform the storage controller 8 of the host 16 capabilities, including whether the host 16 supports PAV.

Initialization

In preferred embodiments, an operator may encode in the storage controller 18 the structure of the system, including the U/O devices 26a, b, c (volumes), logical subsystem (LSS) information, the base addresses, the alias addresses, the number of channel paths 35 between the storage controller 18 and the channel subsystem 20, the subchannels 32a, b, c, the device numbers, the unit addresses, etc. As discussed, the device number identifies a subchannel 32a, b, c and corresponding I/O device 26a, b, c to the host 16 and the unit address identifies the I/O device 26a, b, c to the storage controller 18. In preferred embodiments, the operator defines the base and alias addresses independently, i.e., the operator does not specify the relationship of aliases to bases. Thus, no binding of base and aliases is implied by the user defined parameters.

Thus, the storage controller 18 maintains the settings, including control units, device addresses, unit addresses, alias addresses, base addresses, channel paths etc. defined by the operator. In preferred embodiments, the storage controller 18 does not have to proceed through initialization to determine the alias and base configurations as does the host 16.

In a static assignment system, once the user defines the alias and base addresses at the storage controller 18, the alias and base addresses remain permanently assigned to specific I/O devices and the channel paths connecting thereto. In such static assignment systems, the relationship between the base and alias addresses is defined by the user for both the host system 16 and storage controller 18 levels. In alternative embodiments, the relationship between the base and alias addresses may be dynamic, which means that the user may dynamically reassign alias addresses to different base addresses.

With dynamic binding systems, during configuration, the host 16 will issue RCD commands to obtain the CDRs describing the I/O devices 26a, b, c and device numbers, unit addresses, and base and alias addresses maintained at the storage controller 18. For each base and alias address, the host 16 will generate UCBs from the CDRs received from the storage controller 18. The host 16 will then bind the alias to base UCBs based on the CDR information received from the storage controller 18. In this way, the host 16 maintains the binding of base and alias addresses for all I/O operations subsequent to the initialization. If an operator reassigns the alias and base addresses at the storage controller 18, then the host 16 would again issue RCD commands to obtain the CDR records describing the new alias and base relationship. The host 16 would then bind the alias and base addresses according to the new relationship indicated in the read CDR records. The binding sets a relationship between a particular UCB and a unit address for the host 16 view. In this way, the binding of alias and base addresses would be available for all subsequent I/O operations. Related IBM patent applications "Method and System for Dynamically Assigning Addresses to an Input/Output Device," U.S. application Ser. No. 09/167,782 and "Method and System for Reassigning Addresses To An Input/Output Device," by Brent C. Beardsley, Allan S. Merritt, Michael A. Paulsen, and Harry M. Yudenfriend, U.S. application Ser. No. 09/167,603, which applications were incorporated by reference in their entirety above, describe systems for dynamically assigning and reassigning alias addresses to base addresses.

At the time the host 16 initiates an I/O operation, a data path is formed consisting of one alias or base UCB, one subchannel, one channel, and one unit address. The host 16 would select a particular base or alias UCB to use for the I/O operation.

Those skilled in the art will appreciate that there are alternative methods for assigning base and alias addresses to particular I/O devices (volumes).

I/O Operations Using the Alias Addressing

Figure 7:
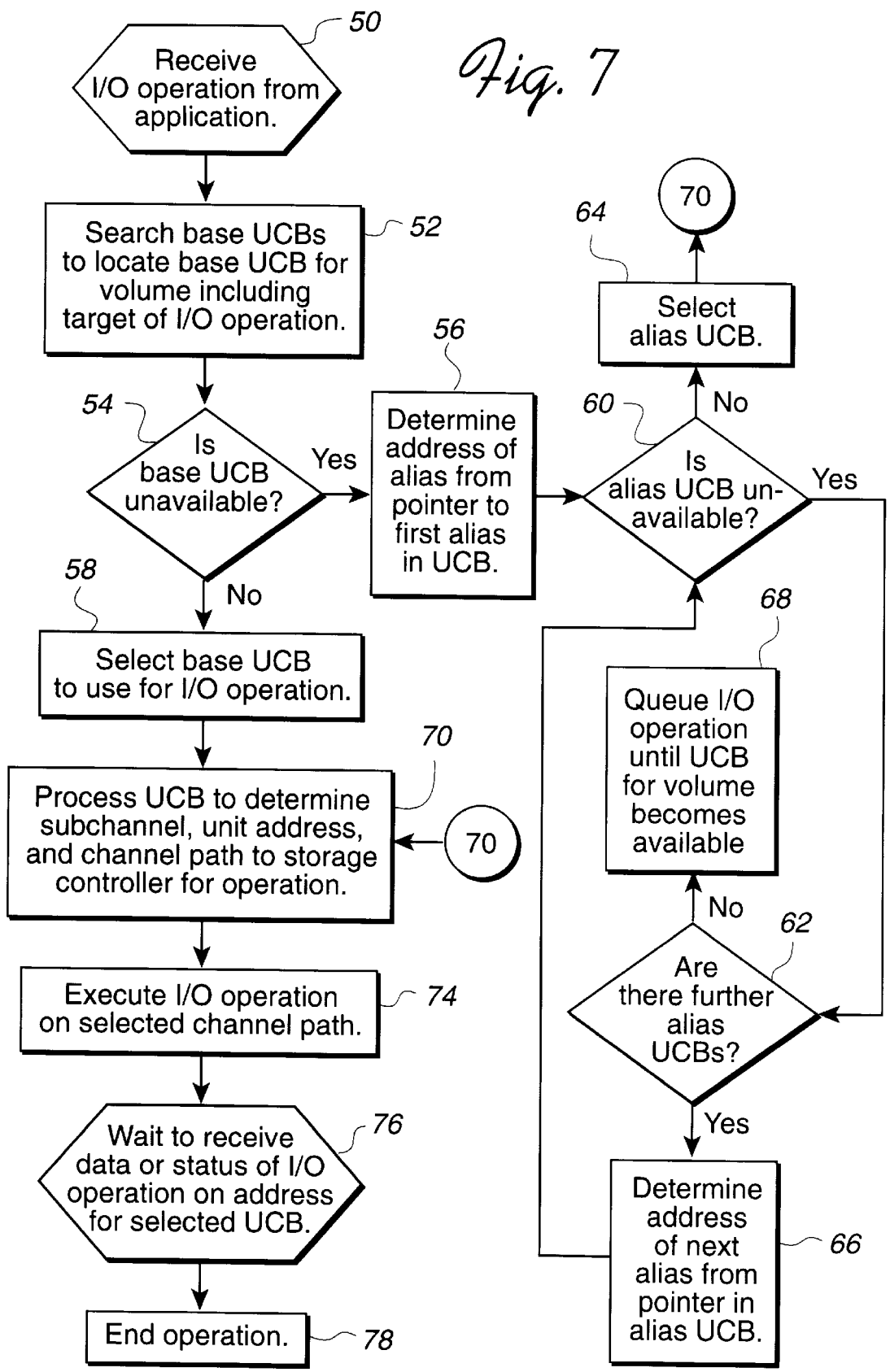
FIG. 7 illustrates logic to process I/O operations in accordance with preferred embodiments of the present invention.

FIG. 7 illustrates logic executed by the CPUs 24a, b to perform I/O operations. This logic may be implemented in a ROM or software accessible to the CPUs 24a, b and the channel subsystem 20. Control begins at block 50 which represents the host 16, i.e., CPUs 24a, b, receiving an I/O operation from an application program executing within the host 16 or from an external system. Alternatively, the CPUs 24a, b may initiate the I/O operation. Control transfers to block 52 which represents the host 16 searching the ULUT 36 to locate a base UCB for a volume including the target storage areas for the I/O operation. As discussed, the base UCB maintains volume information. After locating the base UCB for the target volume, control transfers to block 54 which represents the host 24a, b determining whether the base UCB is dedicated to a concurrent I/O operation or otherwise unavailable. If so, control transfers to block 56; otherwise, control transfers to block 58.

If the base UCB is unavailable, then, at block 56, the host 16 processes the base UCB to determine the first alias address from the pointer to the first alias maintained by the base UCB, i.e., the first alias UCB 40a in the PAV circular queue as shown in FIG. 4. Control then transfers to block 60 which represents the host 16 determining whether the alias UCB is unavailable. If so, control transfers to block 62; otherwise, control transfers to block 64 to select the located alias UCB. Once the alias UCB is selected, control transfers to block 70 to use the alias address indicated in the selected alias UCB to address the I/O operation. If the alias UCB is unavailable, then control transfers to block 62 which represents the host 16 determining whether there are further alias UCBs. This may be determined by examining a counter of the total number of alias UCBs for the base or by determining whether the alias UCB includes a pointer to a next alias UCB in the PAV circular queue. If there are further alias UCBs, then control transfers to block 66 which represents the host 16 determining the address of the next alias UCB from the pointer in the current alias UCB. Control then transfers back to block 60 et seq. to determine whether to use the alias address associated with the located alias UCB. If there are no further alias UCBs in the PAV queue, then control transfers to block 68 which represents the host 24a, b queuing the I/O operation until a base or alias UCB for the volume becomes available.

If, at block 54, the base UCB is available, then control transfers to block 58 to select the base UCB to use for the I/O operation. From block 58 or 64, control transfers to block 70 which represents the host 16 processing the selected UCB to determine the subchannel, unit address, and channel path for the I/O operation. Control then transfers to block 74 which represents the host 16 executing the I/O operation on the selected channel path through a channel program selected for the determined subchannel 32a, b, c. Control transfers to block 76 which represents the host system 16 waiting to receive data or status info from the storage controller 18 on the unit address used to execute the I/O operation. Control transfers to block 78 which represents the completion of the I/O operation. Further details of the commands that may be used in I/O operations are described in IBM publication "ESA/390 Principles of Operation," document no. SA22-7201-04, which document was incorporated herein by reference in its entirety above.

The host 16, i.e., CPUs 24a, b, may execute multiple instances of the logic of FIG. 7 to concurrently execute I/O operations toward a single volume using base and alias addresses to address the volume. In this way, the use of alias addresses allows the concurrent execution of I/O operations toward a single I/O device 26a, b, c (volume).

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as implemented in a mainframe operating system, such as the IBM S/390 system, and the IBM 3990 Storage Controller where read/write operations utilize commands such as the define extent command, locate record command, and chain of CCW commands. However, those skilled in the art will appreciate that the use of base and alias addressing to direct I/O operations concurrently to the same volume could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The host 16 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 18.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively, from the host system directly to the I/O device without the intervention of the channel subsystem and subchannel constructs.

In summary, preferred embodiments in accordance with the present invention provide a system for processing an I/O operation. A processing unit determines a base and associated alias addresses to address an I/O device. The processing unit associates the determined base and alias addresses to the I/O device. The association of base and alias addresses is maintained constant for subsequent I/O operations until the processing unit detects a reassignment of the association of base and alias addresses. The processing unit then determines an available base or alias address to use with an I/O operation and may concurrently execute multiple I/O operations against the I/O device using the base and alias addresses.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing input/output (I/O) operations, comprising the steps of:

maintaining information, with a first processing unit, indicating an association of at least one alias address to a base address, wherein the base and associated alias addresses are capable of being used to address an I/O device;

querying, with a second processing unit, the first processing unit for information on base and associated alias addresses for at least one I/O device;

processing, with the second processing unit, the queried information to determine the base and associated alias addresses that address the I/O device;

determining, with the second processing unit, whether the base address for an I/O device is available;

initiating a first I/O operation with the second processing unit against the I/O device using the base address after determining that the base address is available; and initiating a second I/O operation with the second processing unit against the I/O device using one of the alias addresses to access the I/O device when the base address is unavailable, wherein the second processing unit executes the first and second I/O operations concurrently against the I/O device.

2. A method for processing an input/output (I/O) operations, comprising the steps of:

determining, with a processing unit, a base and associated alias addresses, wherein the base and associated alias addresses are capable of being used to address an I/O device;

associating the determined base and alias addresses to the I/O device, wherein the association of base and alias addresses is maintained constant for subsequent I/O operations until the processing unit detects a reassignment of the association of base and alias addresses;

determining, with the processing unit, whether the base address for an I/O device is available;

initiating a first I/O operation against the I/O device using the base address after determining that the base address is available; and initiating a second I/O operation against the I/O device using one of the alias addresses to access the I/O device when the base address is unavailable, wherein the processing unit executes the first and second I/O operations concurrently against the I/O device.

3. The method of claim 2, further comprising the steps of:

receiving, with the processing unit, first returned data including base address information;

processing, with the processing unit, the base address information provided with the returned data to determine that the first returned data relates to the first I/O operation;

receiving, with the processing unit, second returned data including alias address information; and processing, with the processing unit, the alias address information provided with the second returned data to determine that the second returned data relates to the second I/O operation.

4. The method of claim 2, wherein the step of providing a base address comprises:

maintaining, with the processing unit, a table maintained in a memory area accessible to the processing unit, wherein the table identifies a control block for each base and associated alias addresses, wherein a base control block includes a pointer to a first alias control block, and wherein the first alias control block includes a pointer to a second alias control block, wherein the base, first alias, and second alias control blocks linked by the pointers address the same I/O device;

wherein the processing unit determines whether the base address for the I/O device is available by processing the base control block, and wherein the step of initiating the first I/O operation further comprises the processing unit processing the base control block to determine the base address to use for the first I/O operation after determining that the base address is available; and wherein the step of initiating the second I/O operation further comprises:

(i) processing the pointer in the base control block to determine the first alias control block;

(ii) processing the first alias control block to determine whether the first alias address to which the base address points is available after determining that the base address is unavailable; and (iii) selecting the first alias address to use for the second I/O operation after determining that the first alias address is available.

5. The method of claim 2, wherein a plurality of alias addresses are associated with a base address, wherein a base control block maintains information on the base address and an alias control block maintains information on an alias address, wherein the base control block includes a pointer to a related first alias control block, and wherein a given alias control block points to another alias control block associated to the same base control block, wherein the pointers in the alias control blocks associated with the same base control block form a circular queue, wherein the step of initiating the second I/O operation comprises the steps of:

determining the base control block corresponding to the I/O device that is the target of the second I/O operation;

processing the pointer in the base control block pointing to the first alias control block to determine the alias address from the first alias control block; and using the alias address from the first alias control block to address the I/O device for the second I/O operation.

6. The method of claim 5, wherein a plurality of alias addresses are linked by pointers to the base control block, and wherein additional I/O operations are performed by performing the steps of:

determining the base control block corresponding to the I/O device that is the target of the additional I/O operation;

processing the pointers in the base control block and unavailable alias control blocks to determine an available alias control block that addresses the I/O device; and processing the first available alias control block to determine an alias address for the I/O operation to address the I/O device.

7. The method of claim 2, wherein a first memory area maintains a control block for each base and alias address, wherein the memory area and control blocks are accessible to the processing unit, and wherein the control block includes information identifying a data structure in a second memory area indicating a plurality of data paths to a control unit controlling access to the I/O device, wherein the step of initiating an I/O operation comprises relating the control block in the first memory area to the corresponding data structure in the second memory, wherein the data structure relates the control block to a plurality of data paths between the processing unit and a control unit that controls access to the I/O device.

8. The method of claim 2, further comprising the steps of:

transferring, with the processing unit, the I/O operation using one of the base and associated alias addresses to a control unit controlling access to the I/O device;

determining, with the control unit, whether the address used for the I/O operation is one of a base and alias address;

determining, with the control unit, the base address for the alias address when an alias address is used for the I/O operation; and executing, with the control unit, the I/O operation against the determined base address.

9. The method of claim 8, further comprising the step of maintaining, with the control unit, address control blocks for base and associated alias addresses, wherein the alias address control blocks include pointers to the associated base address, wherein the control unit determines the base address for the alias address by performing the further steps of:

processing the control block for the alias address to determine the control block for the base address; and processing the control block for the base address to determine the base address.

10. A system for processing input/output (I/O) operations, comprising:

a first processing unit;

a second processing unit;

an I/O device;

a memory device accessible to the first processing unit, wherein the first memory device maintains information indicating an association of at least one alias address to a base address, wherein the base and associated alias addresses are capable of being used to address the I/O device; and program logic, executed by the second processing unit, comprising:

(i) means for querying the first processing unit for information on base and associated alias addresses for at least one I/O device maintained in the first memory device;

(ii) means for processing the queried information to determine the base and associated alias addresses that address the I/O device;

(iii) means for determining whether the base address for an I/O device is available;

(iv) means for initiating a first I/O operation against the I/O device using the base address after determining that the base address is available; and (v) means for initiating a second I/O operation with the second processing unit against the I/O device using one of the alias addresses to access the I/O device when the base address is unavailable, wherein the second processing unit executes the first and second I/O operations concurrently against the I/O device.

11. A system for processing input/output (I/O) operations, comprising:

a processing unit;

an I/O device; and program logic executed by the processing unit, including:

(i) means for determining a base and associated alias addresses, wherein the base and associated alias addresses are capable of being used to address an I/O device;

(ii) means for associating the determined base and alias addresses to the I/O device, wherein the association of base and alias addresses is maintained constant for subsequent I/O operations until the processing unit detects a reassignment of the association of base and alias addresses;

(iii) means for determining whether the base address for an I/O device is available;

(iv) means for initiating a first I/O operation against the I/O device using the base address after determining that the base address is available; and (v) means for initiating a second I/O operation against the I/O device using one of the alias addresses to access the I/O device when the base address is unavailable, wherein the processing unit executes the first and second I/O operations concurrently against the I/O device.

12. The system of claim 11, wherein the program logic further includes:

means for receiving first returned data including base address information;

means for processing the base address information provided with the returned data to determine that the first returned data relates to the first I/O operation;

means for receiving second returned data including alias address information; and means for processing the alias address information provided with the second returned data to determine that the second returned data relates to the second I/O operation.

13. The system of claim 11, further comprising a memory device including at least one data structure processed by the processing unit, wherein the data structures comprise:

a base control block;

a first and second alias control blocks;

a pointer in the base control block addressing the first alias control block; and a pointer in the first alias control block addressing the second alias control block, wherein the base, first alias, and second alias control blocks linked by the pointers address the same I/O device, wherein the processing unit processes the control blocks and pointers therein to select one of an available base and alias address.

14. The system of claim 12, wherein a plurality of alias addresses are associated with a base address, further comprising:

a memory device including at least one data structure processed by the processing unit, wherein the data structures comprise:

(i) a base control block maintaining information on the base address;

(ii) a plurality of alias control blocks maintaining information on alias addresses;

(iii) a base pointer in the base control block addressing an associated first alias control block; and (iv) an alias pointer in the alias control block, wherein a given alias pointer addresses another alias control block associated with the same base control block, wherein the pointers in the alias control blocks associated with the same base control block form a circular queue; and wherein the processing unit processes the control blocks and pointers therein to select one of a base and alias addresses that is available to address the I/O device.

15. The system of claim 14, wherein a plurality of alias addresses are linked by pointers to the base control block, wherein the program logic further includes:

means for determining the base control block corresponding to the I/O device that is the target of an additional I/O operation;

means for processing the pointers in the base control block and unavailable alias control blocks to determine an available alias control block that addresses the I/O device; and means for processing the first available alias control block to determine an alias address for the I/O operation to address the I/O device.

16. The system of claim 11, further comprising:

a first memory area including control block data structures processed by the processing unit, wherein the control block data structures comprise information identifying at least one channel data structure; and a second memory area including channel data structures processed by the processing unit, wherein the channel data structures comprise information indicating a plurality of data paths to a control unit controlling access to the I/O device, wherein the processing unit processes the control block data structures in the first memory area to determine a channel data structure in the second memory, and wherein the processing unit processes the determined channel data structure to determine a plurality of data paths between the processing unit and a control unit that controls access to the I/O device.

17. The system of claim 11, further comprising:

a control unit controlling access to the I/O device, wherein the program logic executed by the processing unit further includes means for transferring the I/O operation using one of the base and associated alias addresses to the control unit; and program logic executed by the control unit, including:

(i) means for determining whether the address used for the I/O operation is one of a base and alias address;

(ii) means for determining the base address for the alias address when an alias address is used for the I/O operation; and (iii) means for executing the I/O operation against the determined base address.

18. The system of claim 17, further comprising a memory device including data structures processed by the control unit, wherein the data structures comprise a base address control block and associated alias address control blocks, wherein the alias address control blocks include pointers to the associated base address, and wherein the program logic executed by the control unit further comprises means for processing the alias address control block associated with an alias address used for the I/O operation to determine the base address control block.

19. An article of manufacture for use in programming a first and second processing units to process I/O operations, the article of manufacture comprising at least one computer readable storage device including at least one computer program embedded therein that causes the first and second processing units to perform the steps of:

maintaining information, with a first processing unit, indicating an association of at least one alias address to a base address, wherein the base and associated alias addresses are capable of being used to address an I/O device;

querying, with a second processing unit, the first processing unit for information on base and associated alias addresses for at least one I/O device;

processing, with the second processing unit, the queried information to determine the base and associated alias addresses that address the I/O device;

determining, with the second processing unit, whether the base address for an I/O device is available;

initiating a first I/O operation with the second processing unit against the U/O device using the base address after determining that the base address is available; and initiating a second I/O operation with the second processing unit against the I/O device using one of the alias addresses to access the I/O device when the base address is unavailable, wherein the second processing unit executes the first and second I/O operations concurrently against the I/O device.

20. An article of manufacture for use in programming a processing unit to process I/O operations, the article of manufacture comprising at least one computer readable storage device including at least one computer program embedded therein that causes the processing unit to perform the steps of:

determining a base and associated alias addresses, wherein the base and associated alias addresses are capable of being used to address an I/O device;

associating the determined base and alias addresses to the I/O device, wherein the association of base and alias addresses is maintained constant for subsequent I/O operations until the processing unit detects a reassignment of the association of base and alias addresses;

determining whether the base address for an I/O device is available;

initiating a first I/O operation against the I/O device using the base address after determining that the base address is available; and initiating a second I/O operation against the I/O device using one of the alias addresses to access the I/O device when the base address is unavailable, wherein the processing unit executes the first and second I/O operations concurrently against the I/O device.

21. The article of manufacture of claim 20, further comprising the steps of:

receiving first returned data including base address information;

processing the base address information provided with the returned data to determine that the first returned data relates to the first I/O operation;

receiving second returned data including alias address information; and processing the alias address information provided with the second returned data to determine that the second returned data relates to the second I/O operation.

22. The article of manufacture of claim 20, wherein the step of providing a base address comprises:

maintaining a table in a memory area accessible to the processing unit, wherein the table identifies a control block for each base and associated alias addresses, wherein a base control block includes a pointer to a first alias control block, and wherein the first alias control block includes a pointer to a second alias control block, wherein the base, first alias, and second alias control blocks linked by the pointers address the same I/O device;

wherein the processing unit determines whether the base address for the I/O device is available by processing the base control block, and wherein the step of initiating the first I/O operation further comprises the processing unit processing the base control block to determine the base address to use for the first I/O operation after determining that the base address is available; and wherein the step of initiating the second I/O operation further comprises:

(i) processing the pointer in the base control block to determine the first alias control block;

(ii) processing the base control block to determine whether the first alias address to which the base address points is available after determining that the base address is unavailable; and (iii) selecting the first alias address to use for the second I/O operation after determining that the first alias address is available.

23. The article of manufacture of claim 20, wherein a plurality of alias addresses are associated with a base address, wherein a base control block maintains information on the base address and an alias control block maintains information on an alias address, wherein the base control block includes a pointer to a related first alias control block, and wherein a given alias control block points to another alias control block associated to the same base control block, wherein the pointers in the alias control blocks associated with the same base control block form a circular queue, wherein the step of initiating the second I/O operation comprises causing the processing unit to perform the further steps of:

determining the base control block corresponding to the I/O device that is the target of the second I/O operation;

processing the pointer in the base control block pointing to the first alias control block to determine the alias address from the first alias control block; and using the alias address from the first alias control block to address the I/O device for the second I/O operation.

24. The article of manufacture of claim 23, wherein a plurality of alias addresses are linked by pointers to the base control block, and wherein additional I/O operations are performed by causing the processing to perform the steps of:

determining the base control block corresponding to the I/O device that is the target of the additional I/O operation;

processing the pointers in the base control block and unavailable alias control blocks to determine an available alias control block that addresses the I/O device; and processing the first available alias control block to determine an alias address for the I/O operation to address the I/O device.

25. The article of manufacture of claim 20, further comprising the step of maintaining, in a memory area, control block data structures for the base and alias address, wherein the memory area and control blocks are accessible to the processing unit, and wherein the control block includes information identifying a channel data structure in a second memory area indicating a plurality of data paths to a control unit controlling access to the I/O device, wherein the step of initiating an I/O operation comprises relating the control block in the first memory area to the corresponding channel data structure in the second memory, wherein the channel data structure relates the control block to a plurality of data paths between the processing unit and a control unit that controls access to the I/O device.

26. The article of manufacture of claim 20, further comprising the steps of:

transferring, with the processing unit, the I/O operation using one of the base and associated alias addresses to a control unit controlling access to the I/O device, wherein the computer programs further cause the control unit to perform the steps of:

determining whether the address used for the I/O operation is one of a base and alias address;

determining the base address for the alias address when an alias address is used for the I/O operation; and executing the I/O operation against the determined base address.

27. The article of manufacture of claim 26, further causing the control unit to perform the step of maintaining address control blocks for base and associated alias addresses, wherein the alias address control blocks include pointers to the associated base address, wherein the control unit determines the base address for the alias address by performing the further steps of processing the control block for the alias address to determine the control block for the base address and processing the control block for the base address to determine the base address.

* * * * *

UNITED STATES PATENT AND TRADEMARK OFFICE
CERTIFICATE OF CORRECTION

PATENT NO. : 6,170,023 B1
DATED : January 2, 2001
INVENTOR(S) : Brent Cameron Beardsley et al.

It is certified that error appears in the above-identified patent and that said Letters Patent is hereby corrected as shown below:

<u>Column 16,</u>
Line 1, delete "arc" and insert -- are --.

<u>Column 19,</u>
Line 28, delete "U/O" and insert -- I/O --.

Signed and Sealed this

Eighteenth Day of February, 2003

JAMES E. ROGAN
*Director of the United States Patent and Trademark Office*